(12) United States Patent
Wnuk et al.

(10) Patent No.: US 8,518,274 B2
(45) Date of Patent: *Aug. 27, 2013

(54) FILTER DEVICE OPERATING METHOD

(75) Inventors: Ralf Wnuk, Bexbach/Kleinottweiler (DE); Jörg Hermann Gerstner, Püttlingen (DE); Bernhard Schlichter, Saabrücken (DE)

(73) Assignee: Hydac Process Technology GmbH, Neunkirchen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/506,763

(22) Filed: May 16, 2012

(65) Prior Publication Data

US 2012/0228239 A1    Sep. 13, 2012

Related U.S. Application Data

(63) Continuation of application No. 12/733,968, filed as application No. PCT/EP2008/009455 on Nov. 10, 2008, now Pat. No. 8,216,469.

(30) Foreign Application Priority Data

Nov. 16, 2007  (DE) .......................... 10 2007 054 737

(51) Int. Cl.
  *B01D 29/52*    (2006.01)
  *B01D 29/68*    (2006.01)

(52) U.S. Cl.
  USPC ........................................................ 210/791

(58) Field of Classification Search
  USPC ........................................................ 210/791
  See application file for complete search history.

(56) References Cited

U.S. PATENT DOCUMENTS

| 3,318,452 | A |   | 5/1967  | Adams           |
|-----------|---|---|---------|-----------------|
| 3,703,465 | A |   | 11/1972 | Reece           |
| 4,055,500 | A | * | 10/1977 | Parker ........................ 210/412 |
| 4,059,518 | A |   | 11/1977 | Rishel          |
| 4,462,916 | A |   | 7/1984  | Ecabert et al.  |
| 4,636,311 | A |   | 1/1987  | Litzenburger    |
| 4,642,188 | A |   | 2/1987  | DeVisser et al. |
| 4,666,592 | A |   | 5/1987  | Bea             |
| 4,936,989 | A |   | 6/1990  | Walker          |
| 6,799,687 | B1|   | 10/2004 | Schon           |

FOREIGN PATENT DOCUMENTS

| DE | 2658363         | A  | 6/1978  |
|----|-----------------|----|---------|
| DE | 3405179         | A1 | 8/1985  |
| DE | 197 18 028      | C1 | 6/1998  |
| DE | 199 56 859      | A1 | 6/2001  |
| DE | 100 24 401      | A1 | 11/2001 |
| DE | 10 2005 016 151 | A1 | 10/2006 |
| EP | 0 062 549       | A2 | 10/1982 |
| EP | 0 656 223       | A1 | 6/1995  |

* cited by examiner

*Primary Examiner* — Thomas M Lithgow
(74) *Attorney, Agent, or Firm* — Roylance, Abrams, Berdo & Goodman, LLP

(57) ABSTRACT

A filter device operating method involves a plurality of filter elements (21) received in a filter housing having a filter inlet for a fluid to be filtered and a filter outlet for the filtered fluid. Flow through the filter elements (21) is possible in both directions for filtration or backwashing. Because the shut-off element (41) is a fast-closing plate valve (43) actuated by a hydraulic piston (53) and blocks the fluid connection so quickly, a feeding effect is created in the manner of a pressure blow on the backwashed filter element (21). The feeding effect increases the cleaning of pollution on the filter element (21), achieving an improved backwashing cleaning.

4 Claims, 4 Drawing Sheets

US 8,518,274 B2

FILTER DEVICE OPERATING METHOD

CROSS-REFERENCE TO RELATED APPLICATION

This application claims priority to under 35 U.S.C. §120 and is a continuation or division of U.S. patent application Ser. No. 12/733,968, filed Apr. 1, 2010 and entitled Filter Device, now U.S. Pat. No. 8,216,469, the entire subject matter thereof is incorporated by reference.

FIELD OF THE INVENTION

The invention relates to a method of operating a filter device with a plurality of filter elements in a filter housing for filtering fluid through the filter elements and for backwashing to clean the filter elements.

BACKGROUND OF THE INVENTION

DE 199 56 859 A1 (corresponding to U.S. Pat. No. 6,799,687) discloses a filter device having conically shaped filter elements, in particular in the form of tubular wedge wire screen filter elements. Due to the conical execution, the distance between the individual conical, tubular wedge wire screen filter elements is increased in individual areas, with the result that the outflow space in the filter housing is also enlarged. During backflushing, the conical filter element is distinctly advantageous compared to a cylindrical one, primarily because the relatively large exit cross section of the conical filter elements relative to the cylindrical ones for the same filter surface. Since the exit cross section for conical filter elements relative to the entry cross section formed by the filter surface, i.e., the free element area, however, is small, depending on the amount of flow resistance of the split tube, a bottleneck forms in which a large part of the system pressure drops. Therefore, smaller pressure losses occur that is more favorable in terms of energy in backflushing.

In backflushing, a large part of the volumetric throughput for conical and for cylindrical filter elements is generally achieved on the lower filter end. The volumetric flows then decrease very quickly. In addition, for conical elements the velocity gradient is smaller, so that including the velocity profile, relative to the filter surface, an additional cleaning effect compared to cylindrical elements arises due to the conicity of the elements. Due to the essentially constant velocity that is achieved in the cleaning of the conical filter elements, this cleaning takes place carefully and prolongs the service life of the pertinent filter elements.

In backflushing, preferably all filter elements are regenerated in succession. During backflushing of individual elements, filtration is continued via the remaining elements so that filtration operation is not interrupted at any time.

In the known filter device, the backflushing process does not take place exclusively such that the overpressure prevailing in the filter device during the backflushing phase allows a partial stream of the filtrate to flow through the filter element to be cleaned in the reverse direction to detach and carry away dirt from the element. In the effort to be able to remove even the most stubborn dirt, to support backflushing, a pressure control means generates a negative pressure on the respective filter element to be backflushed. Therefore, not only is the system pressure active in backflushing, but a higher pressure gradient for detaching dirt is available due to the applied negative pressure.

In the known device, the negative pressure means has a hydraulic accumulator in the form of a diaphragm accumulator. The diaphragm forms the separating element of the accumulator for intake or pump motion and is connected to the piston rod of a working cylinder. For this actuation, not only is a considerable control effort necessary, but to ensure operating reliability, a complex construction of the diaphragm accumulator with a piston rod duct and its sealing is necessary. In spite of an expensive construction, relatively long service lives ensuring operating reliability can hardly be achieved. Moreover, considerable installation space for the accumulator and the drive means is necessary.

DE 10 2005 016 151 A1 discloses a filter device with a housing and a filter inlet for the fluid to be filtered, as well as a filter outlet for the filtered fluid. Within the filter housing, several filter elements are provided. The respective filter element having a first through opening is fluid-connected to the filter inlet and through which during the filtration process dirty fluid flows from the inside to the outside. A movable flushing arm with a fluid opening for backflushed dirty fluid can be fluid-connected to the first passage opening of the filter element. As a result a backflushing flow from the outside into the interior of the filter element arises. Because the respective filter element has a second passage opening and one valve unit in the filtration process closing the second passage opening and opening it in the backflushing process, by opening the valve unit in the backflushing process, a second access possibility of the backflushed fluid via the second passage opening enables an additional backflushing flow within the filter element for obtaining a high degree of cleaning in the backflushing process.

DE 100 24 401 A1 discloses a generic backflushing filter device, in particular for lubricating oil filtration. Filter cartridges open on both ends are located in the filter housing around a rotary shaft. Each filter cartridge interior in filter operation can be supplied with the heavy liquid to be filtered. Liquid can flow into the backflush filter with a cleaning means moved by the rotary shaft. For individual or group cleaning of the filter cartridges in backflushing operation, the rotary shaft has at least two flush cocks connected to a drain valve via the rotary shaft. The first flush cock is assigned to one end side of the filter cartridge. The other flush cock is assigned to the other end side of the filter cartridge. Because the first flush cock is arranged offset by an angle in the direction of rotation to the second flush cock, and concomitantly moved first and second sealing members are assigned to the first and second flush cocks for the opposite end side of the filter cartridge. That offset of the flush cocks by an angle in the direction of rotation permits the filter cartridges to be exposed to the flushing pressure in a delayed mode on the two inflow ends. With this backflushing in opposite directions in a delayed mode, high flushing velocities or velocity profiles are achieved over the filter cartridge height. This operation has a beneficial effect especially in the middle regions between the inflow ends due to the higher flushing velocities active there for an improved flushing effect.

SUMMARY OF THE INVENTION

An object of the invention is to provide a filter device operating method which, in addition to good filtration performance, can also provide improved backflushing values and which is characterized both by an especially simple construction and high operating reliability in long-term operation.

According to the invention, this object is basically achieved by a filter device operating method where the blocking element is a quick-closing plate valve triggered by a fluid pressure operated piston and quickly blocking the fluid connection providing a fluid pressure operated shock on the backflushed filter element. A feeding effect arises to increase the removal of dirt on the filter element, achieving improved cleaning in the backflushing of the respective filter element. Due to the special configuration of the blocking element, in the fluid flow entering the filter element before the backflushing process, an abrupt flow interruption occurs so that the flow velocity prevailing in the blocking process as a flow-dynamic effect causes a strong feeding effect. For the flow through the filter element reversed relative to filtration, therefore, not only is the system pressure available on the clean side of the pertinent filter element, but the backflow of filtrate is intensified by the feeding effect available as a result of the indicated dynamic effect arising by the sudden blocking of the flow flowing in from the contaminated side. With the solution according to the invention, a type of hydraulic shock function arises whose action is improved to the extent conical filter elements are used. The conical filter elements then cause a feeding effect uniformly over the entire element and not only in defined middle areas, as indicated in the prior art.

The plate valve used, as a blocking element of the pressure control enables an especially simple construction which is favorable in production. Furthermore, the plate valve requires little installation space and, in this respect, can be easily integrated into the filter housing. Moreover, operating reliability is ensured over virtually unlimited operating times.

Preferably, each filter element has an inner filter cavity defining a longitudinal axis extending between the end-side input opening connected to the filter inlet during filtration, and an end-side discharge opening opposite thereto. Via the discharge opening, in the course of backflushing, the contaminated fluid can be discharged. The input opening of the filter element to be cleaned for backflushing is blockable by the blocking element. Preferably, filter elements are located with a vertical longitudinal axis in the filter housing with a shape that is tapered conically to the top. As already mentioned above, among other factors, this arrangement promotes efficiency of backflushing, viewed over the entire element.

In advantageous exemplary embodiments, the discharge opening of the filter element to be cleaned can be connected to a backflushing line alternately cleared or blocked by a valve. This valve yields the additional option of controlling the flow in the outflow region of the dirty fluid. In particular, when the backflushing line has a length greater or considerably greater than the length of the filter elements measured in the direction of the longitudinal axis, then, by controlling the flow velocity of a comparatively long fluid column, a dynamic effect develops an especially strong feeding effect, and thus, especially achieves effective cleaning.

In preferred exemplary embodiments, the backflushing means has a movable backflushing arm connected by a drive to the discharge opening of the filter element to be cleaned. The blocking element in the course of motion of the backflushing arm by the drive can be aligned to the input opening of the filter element connected to the backflushing arm to clear or block fluid entry into its filter cavity.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
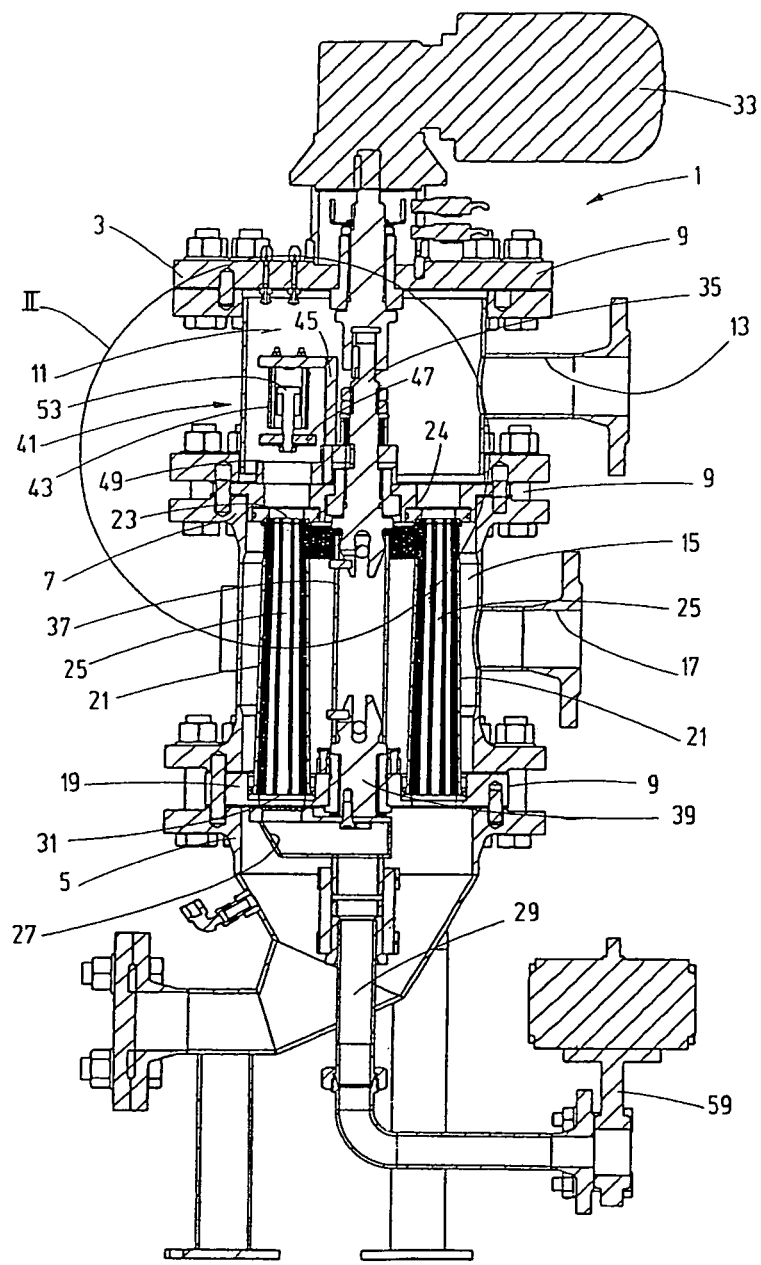
FIG. 1 is a schematic, not to scale, side elevational view in section of a filter device according to one exemplary embodiment of the invention.

The filter device shown in the figures has a cylindrical housing 1 with an upper sealing cover 3, a lower housing termination 5, and an interposed intermediate bottom 7, all of which can be fixed on the filter housing 1 by flange connections 9. In the housing 1, the intermediate bottom 7 separates a space 11 for the unfiltered material, into which fluid to be filtered can flow via the filter inlet 13, from the clean side 15 of the filter device, from where filtered fluid can be discharged via the filter outlet 17.

Between the intermediate bottom 7 and an element receiver 19 located on the lower housing termination 5, filter elements 21 extending conically upward, are inserted. In place of the conical filter elements 21, at least partially cylindrical filter elements (not shown) can be used. The conical filter elements 21 can be tubular wedge wire screen filter elements and are arranged at distances from one another along a cylindrical arc within the filter housing 1. In one embodiment not detailed, filter elements 21 in groups subdivided repeatedly along cylindrical arcs can be provided.

The filter elements 21 are shown in the drawings with their inlet cross sections, i.e., with their input or input openings 23 opening into recesses 24 of the intermediate bottom 7 made correspondingly cylindrical. Via recesses 24, openings 23 are fluid-connected to the space 11 containing the unfiltered material. For the filtration process, unfiltered material enters the inner filter cavity 25 of the filter elements 21 and flows through the filter elements 21 to the outside toward the clean sides of the filter elements. In the backflushing process, conversely, flow takes place from the outside (clean side 15) to the inside through the respective filter element to be cleaned. By a pivotally mounted backflushing arm 27 forming the start of a backflushing line 29 and leading out of the filter housing 1, the dirty fluid containing the detached dirt in the backflushing process flows via a bottom-side discharge opening 31 out of the filter element 21 being cleaned.

The backflushing arm 27 for its pivoting motion can be driven by a geared motor 33 by a drive shaft located concentrically in the filter housing 1. The drive shaft has an upper shaft journal 35 attached to the driven side of the geared motor 33, a hollow intermediate shaft 37, and a lower shaft journal 39 connected to the backflushing arm 37. The filter elements are concentrically arranged about the rotational drive axis of the drive shaft.

Figure 2:
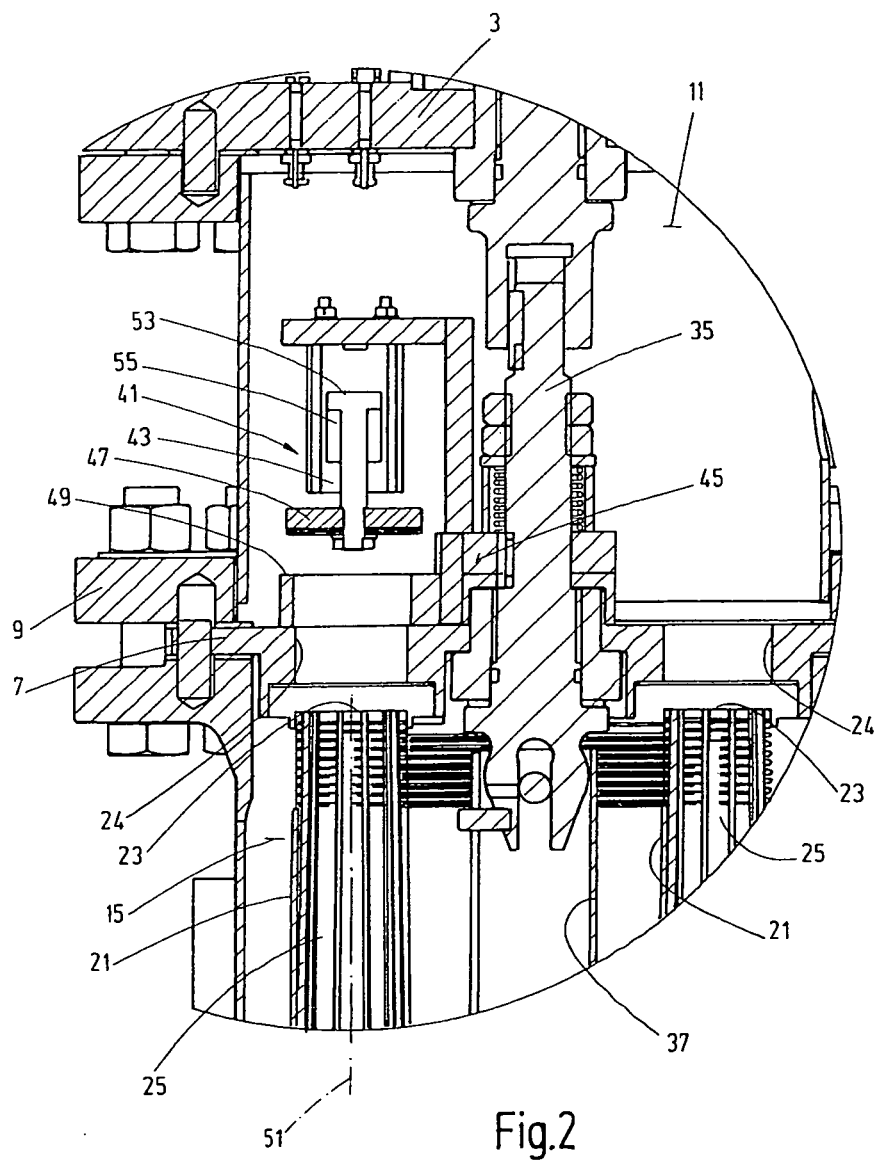
FIG. 2 is an enlarged side elevational view in section of the region II of FIG. 1.

The geared motor 33 is used not only to pivot the backflushing arm 27, but also forms the pivot drive for a blocking element 41. By blocking element 41, for a backflushing process, the fluid connection between the unfiltered material in the space 11 and the filter cavity 25 of the filter element 21 to be cleaned can be stopped by its input opening 23 being closed. The relevant details of the blocking element 41 containing the plate valve 43 are illustrated in FIGS. 2 to 4.

As is apparent from these figures, the plate valve 43 is located on a carrier 45 connected to the shaft journal 35 so that the geared motor 33 pivots the plate valve 43 together with the backflushing arm 27. By the geared motor 33, the backflushing arm 27 and the plate valve 43 are set into the pivot position in which the filter element 21, located on the left side in the figures, is chosen for a backflushing process. The plate or blocking valve 43 has a laterally extending valve plate 47 interacting with the valve seat 49 on the carrier 45. The closing motion of plate valve 43 takes place along the longitudinal axis 51 for lining up the valve plate 47 with and for blocking the input opening 23 of the pertinent filter element 21. The valve plate 47 can be moved by a hydraulic piston 53 guided in a hydraulic cylinder 55 connected to the carrier 45 and extending perpendicular to valve plate 47 and parallel to the drive axis of the drive shaft 35, 37, 39.

Figure 3:
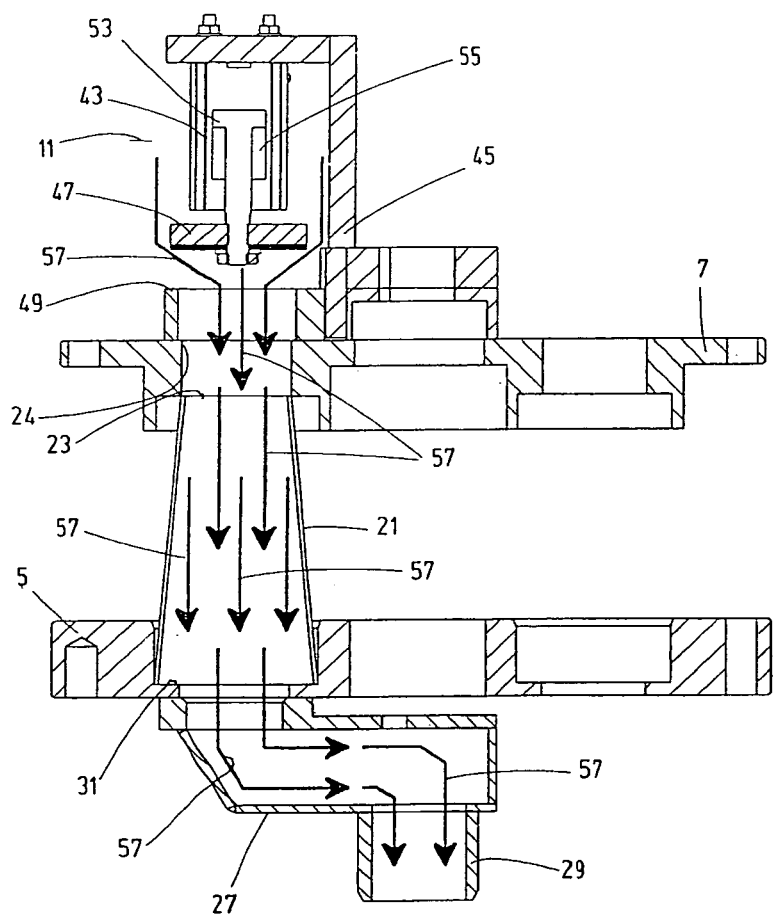
FIG. 3 is a schematic, greatly simplified partial extract of the filter device of FIG. 1 drawn markedly shortened in the vertical direction, where a filter element is prepared for backflushing and a fluid flow passes through it being shown schematically.
Figure 4:
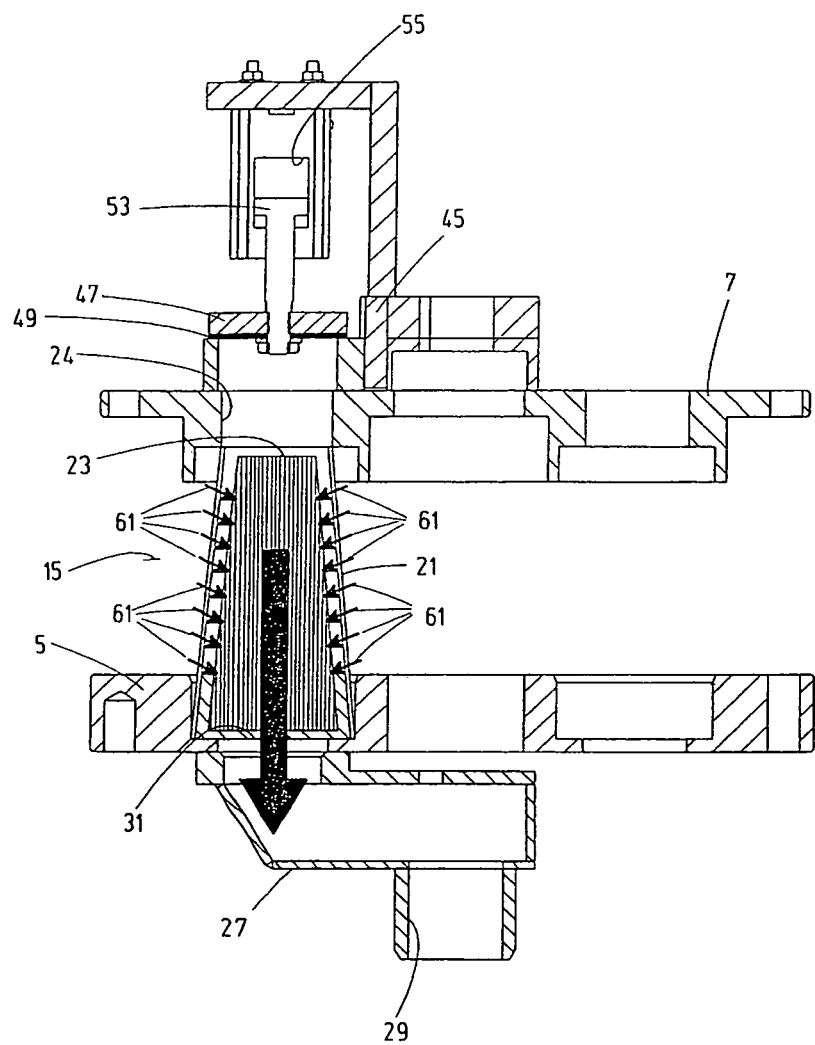
FIG. 4 is a representation similar to FIG. 3 for illustration of the fluid flow prevailing in the actual backflushing process.

To illustrate the mode of operation, reference is made especially to FIGS. 3 and 4. FIG. 3 shows by flow arrows 57 (not all numbered in the figures) how the fluid flows in the filter element 21 selected for a backflushing process. The input opening 23 of the backwashed filter element is aligned with the plate valve 43. The discharge opening 31 of the backwashed filter element is connected to the backflushing arm 27. This flow state shown in FIG. 3 prevails when a valve 59 (shown only in FIG. 1), clears the backflushing line 29 and the plate valve 43 is not yet closed. If, at this point, for the backflushing process, the plate valve 43 is closed in this flow state, i.e., the afterflow of unfiltered material out of the space 11 into the filter element 21 is blocked, the flow is reversed on the filter element 21. As a result of the flow velocity of the unfiltered material flowing through the filter element 21 from the space 11 (state from FIG. 3), blocking of the plate valve 43 leads to a negative hydraulic shock. As a result of the negative hydraulic shock, a feeding effect arises. For the backflow indicated with the flow arrows 61 in FIG. 4 into the filter element 21 from the standpoint of the clean side 15, not only the system pressure, but in addition a feeding effect, are available by the blocking of the unfiltered liquid column. Even the most stubborn dirt is detached from the filter medium by the nozzle action arising in this way at the passage sites of the filter medium. An especially strong feeding effect occurs when the backflushing line 29 has a greater length, i.e., the blocking process takes place at flow velocities corresponding to a relatively long fluid column.

While one embodiment has been chosen to illustrate the invention, it will be understood by those skilled in the art that various changes and modifications can be made therein without departing from the scope of the invention as defined in the appended claims.

What is claimed is:

1. A method of operating a filter device, comprising the steps of:
    conveying unfiltered fluid to be filtered into a filter inlet of a filter housing having a plurality of filter elements received in the filter housing;
    passing the unfiltered fluid through element input openings and into inner filter cavities of the filter elements in filter positions and through those filter elements to produce filtered fluid on exteriors of those filter elements;
    conveying the filtered fluid to and through a filter outlet in the filter housing to discharge the filtered fluid;
    placing at least one of the filter elements into a backflushing position while unfiltered fluid continues to flow through an element input opening thereof and into an inner filter cavity thereof;
    moving a movable backflushing arm by a drive to an end-side discharge opening longitudinally opposite the element input opening of the filter element in the backflushing position;
    moving a laterally extending blocking valve plate by the drive with the backwashing arm into alignment with the element input opening of the filter element in the backflushing position by being connected to the backflushing arm;
    quickly moving the blocking valve plate by a fluid operated piston with a piston extending perpendicular to the lateral extent of the valve plate from an open position spaced from the element input opening of the filter element in the backflushing position allowing unfiltered fluid to flow therein to a blocking position closing a fluid connection between the filter inlet and the inner filter cavity at the element input opening at least one of at a start of backflushing and during backflushing to create a hydraulic shock on the filter element in the backflushing position and to produce a feeding effect increasing removal of dirt thereon; and
    discharging dirty fluid from the end-side discharge opening of the filter element in the backflushing position during backflushing.

2. A method according to claim 1 wherein
a backflushing line is connected to the discharge opening of the filter element in the backflushing position, the backflushing line being alternatively cleared during backflushing and closed when backflushing has ceased.

3. A method according to claim 2 wherein
the backflushing line has a length greater than a length of the filter elements along longitudinal axes thereof.

4. A method according to claim 1 wherein
only one fluid pressure operated piston is provided for each of the filter elements to be backflushed sequentially.

* * * * *